United States Patent
Quentin et al.

(10) Patent No.: US 11,868,992 B2
(45) Date of Patent: Jan. 9, 2024

(54) METHOD OF DATA TRANSMISSION, CORRESPONDING DEVICE, SYSTEM AND COMPUTER PROGRAM

(71) Applicant: Banks and Acquirers International Holding, Paris (FR)

(72) Inventors: Pierre Quentin, Enghien les Bains (FR); Jerome Marcon, Paris (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 915 days.

(21) Appl. No.: 16/074,989

(22) PCT Filed: Jan. 27, 2017

(86) PCT No.: PCT/EP2017/051864
§ 371 (c)(1),
(2) Date: Aug. 2, 2018

(87) PCT Pub. No.: WO2017/133988
PCT Pub. Date: Aug. 10, 2017

(65) Prior Publication Data
US 2019/0043044 A1 Feb. 7, 2019

(30) Foreign Application Priority Data
Feb. 2, 2016 (FR) ...................... 1650827

(51) Int. Cl.
*G06Q 20/20* (2012.01)
*G01C 21/36* (2006.01)
(Continued)

(52) U.S. Cl.
CPC ........... *G06Q 20/382* (2013.01); *G06F 21/44* (2013.01); *G06F 21/602* (2013.01);
(Continued)

(58) Field of Classification Search
CPC .... G06Q 20/382; G06Q 20/204; G06Q 20/20; G06Q 20/202; G06Q 20/327;
(Continued)

(56) References Cited

U.S. PATENT DOCUMENTS

2007/0116292 A1 5/2007 Kurita et al.
2018/0144337 A1* 5/2018 Maniar .................. G06Q 20/36

FOREIGN PATENT DOCUMENTS

WO 2008131133 A2 10/2008

OTHER PUBLICATIONS

International Search Report dated Feb. 16, 2017 for corresponding International Application No. PCT/EP2017/051864, filed Jan. 27, 2017.
(Continued)

*Primary Examiner* — Nathan C Uber
*Assistant Examiner* — Matthew S Weronski
(74) *Attorney, Agent, or Firm* — David D. Brush; Westman, Champlin & Koehler, P.A.

(57) ABSTRACT

A method for transmitting data, implemented within a secured execution environment of an electronic device, called a trusted component, which is coupled to a cash register. The method includes transmitting, by using a payment terminal, a piece of data intended for cash register. The method includes, prior to transmitting the data: receiving, from the cash register, a first request for setting up a first secured communications channel with the trusted component; setting up the first secured communications channel by using at least one piece of data contained in the first request; receiving, from the payment terminal, a second request for setting up a second secured communications channel with the trusted component; and setting up the second secured communications channel with the payment terminal by using at least one piece of data of the second request.

12 Claims, 3 Drawing Sheets

(51) Int. Cl.
  *G01C 21/34* (2006.01)
  *G06Q 20/38* (2012.01)
  *G06F 21/44* (2013.01)
  *G06F 21/60* (2013.01)
  *G06Q 20/32* (2012.01)
  *G06F 21/64* (2013.01)

(52) U.S. Cl.
  CPC .......... *G06F 21/606* (2013.01); *G06F 21/645* (2013.01); *G06Q 20/20* (2013.01); *G06Q 20/202* (2013.01); *G06Q 20/204* (2013.01); *G06Q 20/327* (2013.01); *G06F 2221/2129* (2013.01)

(58) Field of Classification Search
  CPC .... G06F 21/645; G06F 21/602; G06F 21/606; G06F 21/44; G06F 2221/2129
  See application file for complete search history.

(56) References Cited

OTHER PUBLICATIONS

English translation of the International Preliminary Report on Patentability and Written Opinion, Chapter II dated Feb. 16, 2017 for corresponding International Application No. PCT/EP2017/051864, filed Jan. 27, 2017.
Written Opinion of the International Searching Authority dated Feb. 16, 2017 for corresponding International Application No. PCT/EP2017/051864, filed Jan. 27, 2017.
P. Fivel, "IPP3xx Security Target Lite", 26 Movember 2010 (Nov. 26, 2010), XP055304977.

* cited by examiner

METHOD OF DATA TRANSMISSION, CORRESPONDING DEVICE, SYSTEM AND COMPUTER PROGRAM

CROSS-REFERENCE TO RELATED APPLICATIONS

This Application is a Section 371 National Stage Application of International Application No. PCT/EP2017/051864, filed Jan. 27, 2017, which is incorporated by reference in its entirety and published as WO 2017/133988 A1 on Aug. 10, 2017, not in English.

1. FIELD OF THE INVENTION

The invention relates to the field of secured data transmission between two devices. More particularly, the present technique relates to the field of secured data transmission between a master device and a slave device during a process of pairing of the master device with the slave device. According to one particular aspect, the present technique applies to the pairing of a peripheral, such as a payment terminal (as a slave device also called a peripheral) with a payment-receiving device, such as a cash register (acting as a master device).

2. PRIOR ART

The payment-receiving device (such as for example the cash register) and the payment terminal are two essential tools of the merchant, whatever his activity. These are two devices which, as a rule, are connected to each other in order to form a unit enabling the merchant to accept numerous means of payment. The advantages of the payment terminal are many: it is an often secured device that accepts numerous means of payment (smartcard, magnetic stripe card, contactless card, prepaid card, wallets installed on mobile smartphone type terminals) and is well known to the customers.

The payment-receiving device, for its part, enables the merchant to make logs of his activity and centralize sales whatever the means of payment used (card, check or cash). The payment-receiving device also frequently has a barcode reader that is used to scan products, recognize them, display the price and prepare the cash receipt. The cash register has also benefitted from the digitization of the economy and can be connected to a server, by means of a communications network, in order to transmit and receive information coming from inventory management software, accounting software, etc.

In many businesses, the payment-receiving device is a cash register. In many businesses again, the payment-receiving device and the payment terminal are connected with each other. This connection plays a role in the efficiency of the sale process. For example, when the list of articles to be purchased has been prepared, the merchant endorses the amount of the transaction. This amount is automatically transmitted to the payment terminal (the slave device) which then carries out the payment operation independently (i.e. the payment operation as such is not under the control of the cash register). Thus, the user presents his payment means to the payment terminal which, if necessary, requests the entry of additional data (such as a PIN code for example). When the transaction is validated, the payment terminal transmits a piece of data relating to the end of the transaction to the cash register. Hence, a link that is relatively important from the security viewpoint is set up between the cash register and the payment terminal. Indeed, it can be understood that if the payment terminal is replaced or modified without the merchant spotting it, the content of the data that travels between the payment terminal and the cash register can be modified or falsified to the merchant's detriment, for example by the crediting of an account other than that of the merchant or by the obtaining confidential of data on the payment cards used in the payment terminal.

This is why there is a process for setting up secured links between the payment terminal and the cash register. There is a pairing enabling the cash register, in theory, to make sure that the payment terminal with which it is communicating is not a fraudulent terminal. The setting up of a secured link between the peripheral (for example the payment terminal) and the cash register comprises the creation of one and only one secured communications link between the peripheral and a specific securing component, in passing through the payment-receiving device (i.e. through the unsecured operating system). The setting up of a secured link between the peripheral (for example the payment terminal) and the cash register also includes the transmission of an acknowledgement message to the cash register by the peripheral. This message is transmitted at the initiative of the peripheral when the secured link has been set up.

The problem lies by the fact that, on the one hand, this process is implemented through the unsecured operating system of the cash register and, on the other hand, the finalizing of the pairing process is at the initiative of the terminal (of the peripheral).

A fraudulent person who has succeeded in snooping on the data exchanges between a peripheral and a payment-receiving device can therefore replace this peripheral by a fraudulent peripheral configured to replay these same data exchanges and thus obtain confidential data and/or execute unauthorized actions.

3. SUMMARY OF THE INVENTION

The proposed technique does not have at least certain of the drawbacks mentioned here above. The present technique indeed makes it possible to implement a pairing between a peripheral and a payment-receiving device that is truly secured. More particularly, the present technique relates to a method for transmitting data, a method implemented within a secured execution environment of an electronic device, called a trusted component, said trusted component being coupled to a payment-receiving device, said method of data transmission comprising at least one step of transmission, by a peripheral, of a piece of data intended for said payment-receiving device.

Such a method comprises, prior to said step for transmitting data:
a step for receiving, from the payment-receiving device, a first request for setting up a first secured communications channel secured said trusted component;
a step for setting up said first secured communications channel by means of at least one piece of data contained in said first request;
a step for receiving, from said peripheral, of a second request for setting up a second secured communications channel with said trusted component;
a step for setting up said second communications channel between said peripheral by means of at least one piece of data of said second request.

Thus, the peripheral is not capable of directly communicating data to the payment-receiving device. To this end, it must use the trusted component which alone can transmit data to the peripheral.

According to one particular characteristic, said step for setting up said first secured communications channel comprises:
- a step for obtaining an identifier of said payment-receiving device;
- a step of searching, within an authorization data structure, for a piece of data corresponding to said identifier of said payment-receiving device;
- and when said search delivers a positive result:
- a step for pairing said payment-receiving device with said trusted component, implementing a predetermined pairing protocol.

Thus, the trusted component is capable of verifying the validity of the request that is transmitted to it: it can if necessary detect an attempt at fraudulent connection on the part of the payment-receiving device.

According to one particular characteristic, said step for setting up said second secured communications channel comprises:
- a step for obtaining an identifier of said peripheral;
- a step of searching, within an authorization data structure, for a piece of data corresponding to said identifier of said peripheral; and when said search delivers a positive result:
- a step for pairing said peripheral with said trusted component, implementing a predetermined pairing protocol.

Thus, the trusted component is capable of verifying the validity of the request that is transmitted to it: it can if necessary detect an attempt at fraudulent connection on the part of the peripheral.

According to one particular embodiment, subsequently to the step for setting up said second secured communications channel, said method comprises:
- a step for receiving a message of confirmation of pairing coming from said peripheral, said message comprising at least one first piece of encrypted data;
- a step for decrypting said pairing message delivering at least one piece of pairing confirmation data;
- a step for encrypting said at least one piece of pairing data, delivering at least one second piece of encrypted data;
- a step for transmitting said at least one second piece of encrypted data to said payment-receiving device.

According to one particular characteristic, said step for receiving a message of confirmation of pairing coming from said peripheral comprises a step for receiving said at least one first piece of encrypted data coming from said payment-receiving device, which plays the role of a relay between said peripheral and said trusted component.

According to another aspect, the invention relates to an electronic device for the transmission of data, having available a secured execution environment, called a trusted component, said trusted component being coupled with a payment-receiving device, said trusted component comprising means for transmitting data intended for the payment-receiving device and for at least one peripheral.

Such a trusted component comprises:
- means for receiving a first request, from the payment-receiving device, for setting up a first secured communications channel with said trusted component;
- means for setting up said first secured communications channel by means of at least one piece of data contained in said first request;
- means for receiving a second request, from said peripheral, for setting up a second secured communications channel with said trusted component;
- means for setting up said second secured communications channel, between said peripheral by means of at least one piece of data of said second request.

According to another aspect, the present invention also relates to a system of payment of the type comprising a payment-receiving device and a peripheral, said peripheral being configured to carry out payment operations in favor of said payment-receiving device.

Such a system comprises an electronic data transmission device called a trusted component as described here above.

According to one particular characteristic, said peripheral is a device belonging to the group comprising:
- a payment terminal;
- a barcode reader;
- a keypad.

According to a preferred implementation, the different steps of the method according to the invention are implemented by one or more software programs or computer programs comprising software instructions to be executed by a data processor of a device according to the invention and being designed to command the execution of different steps of the methods.

The invention is therefore also aimed at providing a program capable of being executed by a computer or by a data processor, this program comprising instructions to command the execution of the steps of a method as mentioned here above.

This program can use any programming language whatsoever and be in the form of source code, object code or intermediate code between source code and object code such as in a partially compiled form or in any other desirable form whatsoever.

The proposed technique is also aimed at providing an information carrier readable by a data processor and comprising instructions of a program as mentioned here above.

information carrier can be any entity or device whatsoever capable of storing the program. For example, the carrier can comprise a storage means such as a ROM, for example, a CD ROM or a microelectronic circuit ROM or again a magnetic recording means, for example a floppy disk or a hard disk drive.

Furthermore, the information carrier can be a transmissible carrier such as an electrical or optical signal that can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond, in this document, equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the module concerned. It can be a programmable hardware component or a component with an integrated processor for the execution of software, for example, an integrated circuit, a smart card, a memory card, an electronic board for the execution of a piece of firmware etc.

Each component of the system described here above implements of course its own software modules.

The different embodiments mentioned here above can be combined with one another to implement the invention.

4. FIGURES

Other features and advantages of the invention shall appear more clearly from the following description of a preferred embodiment, given by way of a simple illustrative and non-exhaustive example and from the appended drawings, of which:

FIG. 1 presents the way in which the data exchange is performed between a payment terminal and a cash register with the prior-art technique;

FIG. 2 presents a brief illustration of the proposed technique;

FIG. 3 describes one embodiment of a data transmission technique, in a payment system;

FIG. 4 provides a summary description of the architecture of a trusted component;

5. DESCRIPTION

5.1. Reminder of the Principle

As explained here above, the general principle of the proposed technique consists of the implementing of a secured relay between the peripheral and the payment-receiving device.

Here above and here below, it is considered that:
the payment-receiving device is a device comprising means for the execution of an operating system (for example Linux™, Windows™) and a payment-receiving application is executed by this operating system to perform tasks for taking customer orders and taking payment;
the trusted component is a security device; it can be either directly integrated into a motherboard of the payment-receiving device (and in this case form part of the device) or be linked to the payment-receiving device (for example plugged into a USB socket or into another interface of the payment-receiving device); the trusted component implements a trust application, this application taking the form of a process executed by the trusted component;
the peripheral is a device that takes part in the working of the payment-receiving application (mouse, keypad, barcode scanner, payment terminal) and is connected (or connectable) to the payment-receiving device by means of the payment-receiving application.

Figure 1:
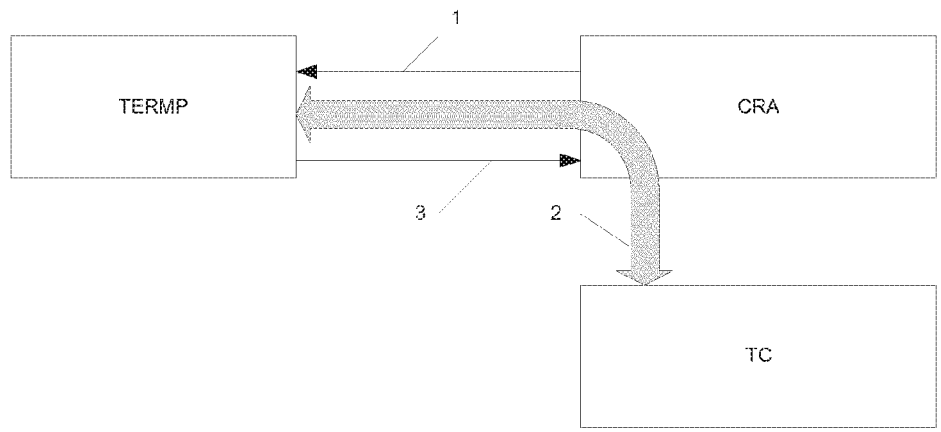

In the prior-art technique, the cash register (or payment-receiving application) plays the role of a relay (proxy relay) between the payment terminal and the trusted component (or application). The prior-art method for transmitting data limits itself to making a secured transmission of data between the trusted component and the payment terminal. FIG. 1 explains the working of the prior-art data transmission method. The payment system comprises a cash register (CRA), a trusted component (TC) and a payment terminal (TERM). When it wishes to use the payment terminal (TERMP), the cash register (CRA) transmits (1) a request indicating this to the payment terminal (TERMP). The trusted component (TC) sets up (2) a secured communications channel between itself and the payment terminal (TERMP). At the end of this establishment, the payment terminal (TERMP) itself confirms (3) the setting up of the secured communications channel to the cash register.

Subsequently, when the peripheral wishes to transmit a piece of data to the payment-receiving device, it carries out a transmission of this piece of data to the trusted component. The trusted component receives this piece of data, encrypts and retransmits it to the peripheral. The peripheral then transmits this encrypted data (received from the trusted component) to the payment-receiving device. These exchanges between the trusted component and the peripheral travel through the payment-receiving device, because it is within the non-secured execution environment (in which the payment-receiving application works) that the communications interfaces (for example, network, USB, Wi-Fi, Bluetooth) are available and usable. The trusted component does not have direct access to these communications interfaces and therefore cannot directly interact with the peripheral. Thus, in a relatively counterproductive way, the payment-receiving device "relays" the data transmitted between the peripheral and the trusted component, but does so imperfectly.

Thus, in the prior-art technique, if the peripheral is fraudulent, the secured channel will not be established between the trusted component and the peripheral but the payment-receiving device (and the payment-receiving application) is not able to know this because it is the peripheral that finally informs the payment-receiving application that it is properly connected. It is therefore sufficient for the attacker to "replay" data previously "picked up" to create the illusion and make the payment-receiving application believe that everything has taken place properly.

The principle of the relay proposed in the present technique is different from the prior-art technique: it consists in setting up a first secured communications channel between the trusted component and the payment-receiving device and then in setting up a second secured channel between the trusted component and the peripheral (for example the peripheral).

Figure 2:
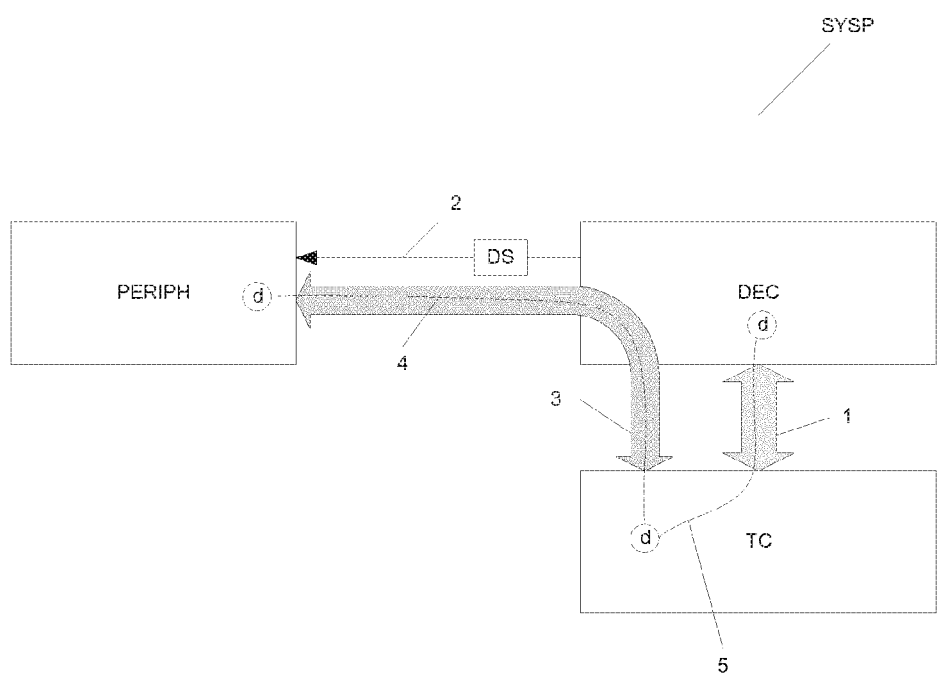

This principle is described with reference to FIG. 2. First of all, the payment-receiving device (DEC) is paired with the trusted component (TC) in order to create a first secured communications channel (1). In a second stage, after the creation of the first secured communications channel (1), the payment-receiving device transmits a pairing request (2) to the peripheral (PERIPH). This request (2), as explained here below, contains a piece of data (DS) known to the payment-receiving device. By using especially this piece of data, the peripheral gets paired with the trusted component (TC) in order to create a second secured communications channel (3). The confirmation of the establishment of the secured channel is no longer transmitted directly by the peripheral to the payment-receiving device. Instead of this, this confirmation is transmitted to the trusted component which relays this confirmation to the payment-receiving device.

Here below, any piece of data (d) coming from the peripheral (PERIPH) and intended for the payment-receiving device (DEC) is transmitted (4) to the trusted component (TC) in this second secured communications channel (3). The trusted component extracts the piece of data received and retransmits (5) this piece of data by using the first secured communications channel (1) to the payment-receiving device (DEC).

In this way, it becomes difficult to directly operate a transmission of data between the peripheral and the payment-receiving device. The transmission of a piece of data is necessarily routed towards the trusted component.

The relay can be qualified as a "double stage" relay in a certain sense, because:

the creation of the secured first communications channel between the payment-receiving device and the trusted component enables a direct exchange of data: the payment-receiving application that is executed within the operating system of the payment-receiving device can then exchange data in a secured manner, directly with the process that is executed by the trusted component;

the creation of the second secured communications channel between the peripheral and the trusted component enables the trusted component to receive the data coming from the peripheral; it however prevents the trust application from retransmitting this data to the peripheral (as in the prior art) since the first secured communications channel can be used directly for this function of transmission to the payment-receiving device.

Thus, it can be understood that the trusted component plays the role of a secured relay between the peripheral and the payment-receiving device; it acts so to speak as a first stage of the relay. The second stage is constituted by the routing function implemented within the payment-receiving device: indeed, the trusted component cannot directly receive the data coming from the peripheral because it does not have its own communications interfaces with the exterior. This means that the data coming from the peripheral and intended for it are routed by the payment-receiving device.

The security is increased because the peripheral is no longer capable of directly transmitting data to the payment-receiving device: it must for this purpose necessarily pass through the trusted component and therefore cannot reutilize the data previously exchanged with the payment-receiving device.

5.2. Description of One Embodiment

Figure 3:
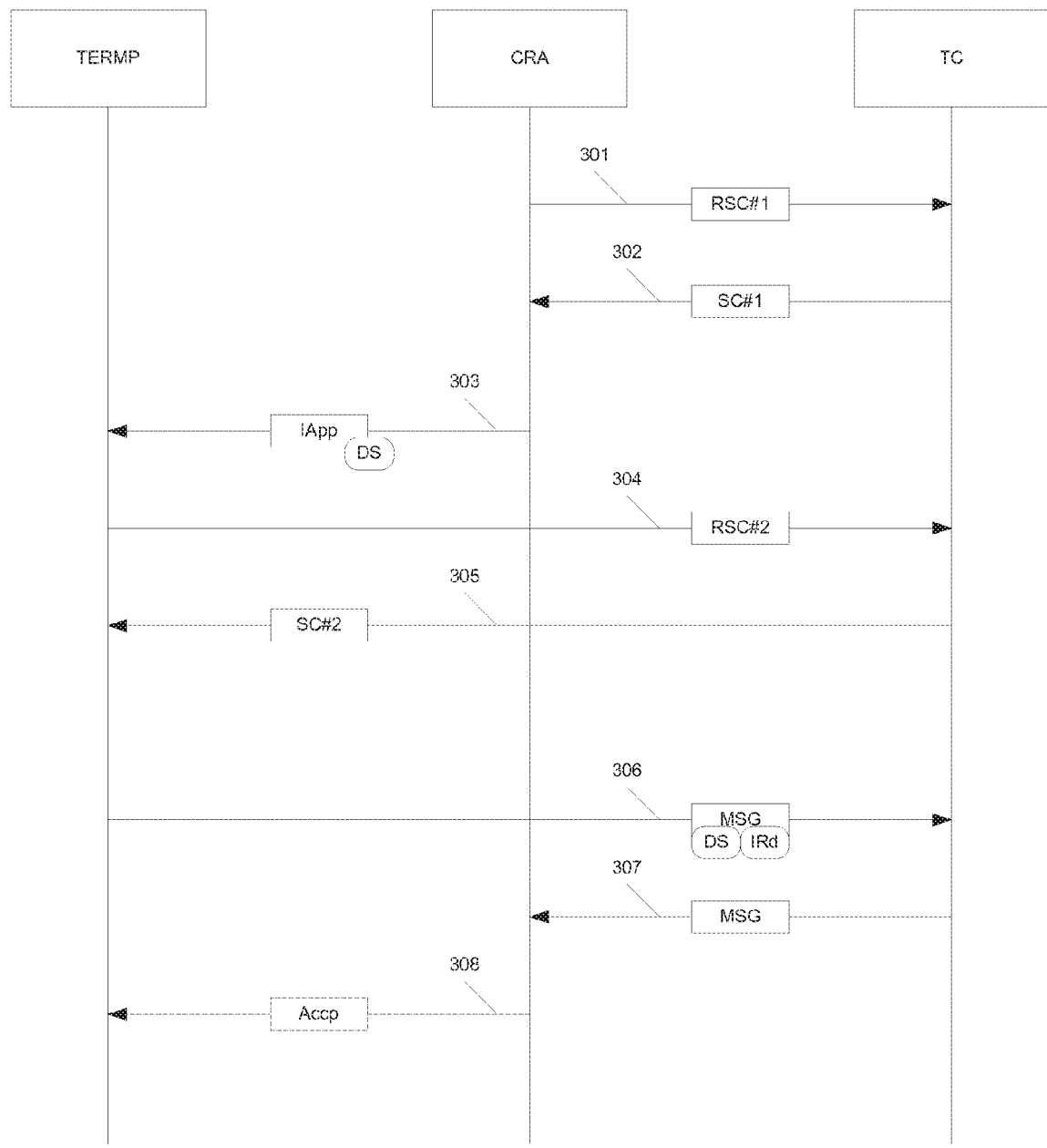

In this embodiment, an implementation of the present technique applied to a payment system is described. This embodiment is described with reference to FIG. 3. The payment system (SYSP) according to the present invention comprises a cash register (CRA) as a payment-receiving device, a payment terminal (TERMP) and at least one component making available a secured execution environment (a trusted component). In this implementation, the payment terminal (TERMP) is considered to be a peripheral, the cash register (CRA) implements a payment-receiving application. The cash register (CRA) in this embodiment is an electronic device built in a manner appreciably identical to a computer. It comprises a processor, a random-access memory, a buffer memory, a set of communications interfaces (USB, Bluetooth, Wi-Fi, Ethernet) and a mass memory. All these components are mounted on a motherboard. The cash register (CRA) also comprises a screen and at least one entry device (touchscreen, keypad). The cash register (CRA) also comprises, optionally, a barcode reader (one-dimensional or two-dimensional for example). All the devices connected to the cash register (CRA) (entry device, interface, etc.) can, depending on the embodiments, be considered to be peripherals. In the present case, however, only the example of a payment terminal (TERMP) taken as a peripheral device is described.

The cash register (CRA) also embeds at least one component making available a secured execution environment. In the embodiment presented here, this component is directly integrated into the motherboard of the cash register (CRA) and is called a trusted component (TC). In other embodiments, a dongle or a USB stick could also be considered to be a secured execution environment and be connected to the cash register (CRA) (connected for example within an internal connector, to the motherboard, on a dedicated connector). From the viewpoint of physical security, it is preferable that the secured execution environment should not be accessible from the exterior in order to prevent any fraud in which this element would be replaced.

In this embodiment, the payment terminal (TERMP) is connected to the cash register (CRA) by means of the Bluetooth interface of this cash register. This interface has the advantage firstly of being a wireless interface and secondly of being a short-range interface that ensures the use of third-party securing mechanisms if the payment terminal (TERMP) should be at a distance for a prolonged period of time. The secured communications channel between the payment terminal (TERMP) and the trusted component (TC) is therefore set up through the Bluetooth interface.

The method of data transmission implemented is the same as the one described here above.

In particular, when the cash register (CRA) is started up, it transmits (301) a request (RSC#1) to the trusted component (TC) for setting up the first secured communications channel (SC#1). On the basis of the request received (RSC#1), the trusted component (TC) sets up (302) the secured transmission channel. To this end, the trusted component (TC) extracts, from the received request (RSC#1), an identifier and makes a search in the list, called a white list, for the presence of this identifier. If it is able to identify the identifier in the white list, the secured communications channel is set up.

In one variant of this embodiment, the identifier of the cash register (CRA) is contained in a piece of data encrypted with a private key of the cash register (CRA). This encrypted data is decrypted (by means of the public key of the cash register (CRA)) by the trusted component (TC) and delivers a piece of clear data (the identifier as such). The trusted component (TC) then makes a search for this piece of clear data in the white list.

In another variant of this embodiment, the identifier of the cash register (CRA) is contained in a piece of data encrypted with a public key of the trusted component (TC). This piece of encrypted data is decrypted (by means of the private key of the trusted component (TC)) by the trusted component (TC) and delivers a piece of clear data. The trusted component (TC) then searches for this piece of clear data in the white list.

In another variant of this embodiment, the identifier of the cash register (CRA) is contained in a piece of data encrypted with a session key shared between the trusted component (TC) and the cash register (CRA). This piece of encrypted data is decrypted (by means of the private session key) by the trusted component (TC) and delivers a piece of clear data. The trusted component (TC) then searches for this piece of clear data in the white list. The session key is renewed periodically, for example either each time that the cash register (CRA) is started up or at regular intervals.

Once the first secured channel is set up, a communication of data (for example comprising data packets coming from a predetermined communications protocol) can be set up from the trusted component (TC) to the cash register (CRA) (and vice versa).

There follows a second step, comprising the creation of the second secured channel, between the payment terminal (TERMP) and the trusted component (TC). This second step is initiated by the transmission (303) by the cash register (CRA), to the payment terminal (TERMP), of a pairing instruction (IApp). This pairing instruction, according to the present technique, is accompanied by a piece of session-initializing data (DS) (for example a counter value), determined by the cash register (CRA). This session-initializing data (DS) is known only to the cash register (CRA). Upon reception of this pairing instruction, the payment terminal (TERMP) initiates the pairing process and, with the trusted component (TC), sets up the second secured communications channel. The payment terminal (TERMP) transmits (304) a request (RSC#2) to the trusted component (TC) for setting up the second secured communications channel (SC#2).

On the basis of the request (RSC#2) received by the payment terminal (TERMP), the trusted component (TC) sets up the secured transmission channel: the trusted component (TC) extracts an identifier from the received request (RSC#2) and searches for the presence of this identifier in a list called a white list. It if succeeds in identifying the identifier in the white list, the secured communications channel is set up (305). The variants of transmission of the identifiers for setting up this second communications channel are the same as those presented here above for the first communications channel.

Once the pairing is done (and therefore once the secured communication is set up with the trusted component (TC)), the payment terminal (TERMP) maintains itself in a state known as a "blocked" state (i.e. it is not capable of carrying out a payment transaction). While it is being maintained in the blocked state, the payment terminal (TERMP) builds a message (MSG) addressed to the cash register (CRA). This message comprises the session-initializing data (DS) (for example, a session-initialization counter or a message sequential counter) previously received from the cash register (CRA) as well as a random number. It is specified that the session-initializing data (for example the counter) must be modified (incremented) in each new message generated by the peripheral towards the cash desk (in order to prevent an attack by replay during a session).

The payment terminal (TERMP) transmits (306) this message to the trusted component (TC); the message (MSG) comprises an instruction for redirecting (IRd) to the cash register (CRA); then the payment terminal (TERMP) passes into a state known as a "transaction ready" state.

Upon reception of this message (MSG), the trusted component (TC) processes this message and then retransmits it (307) on the first secured transmission channel (SC#1). The cash register (CRA) receives (and/or intercepts) this message and decrypts it.

The cash register (CRA) then possesses the information according to which the payment terminal is properly connected (and identified) within the payment system (SYSP). In a complementary and optional way, the method comprises a step of transmission (308) by the cash register (CRA) to the payment terminal (TERMP) of an acceptance message (Accp). This message can advantageously include the "nonce" (random number) previously transmitted by the payment terminal at the initialization of the connection.

In one particular embodiment of the present technique, the step of transmission (306) of the message (MSG) to the trusted component (TC) comprises:

a step of creation of a first pairing confirmation message (MSG1) addressed to the payment-receiving device:
this first message (MSG1) comprises a message identifier (MsgID) and pieces of encrypted data (PaylENc);
the pieces of encrypted data (PayENc) are the result of the encryption, by the payment terminal, of the pieces of data that are ultimately intended for the payment-receiving device and that constitute pieces of pairing confirmation data;
thus, the pieces of data encrypted are: a message identifier (MsgID2), a counter, the session-initializing data (DS) and other protocol data; the second message identifier (MsgID2) can be identical to the first message identifier (MsgID): thus, a strong link is made between the command of the peripheral and the response of the payment-receiving device;
a step of transmission of the first message (MSG1) addressed to the payment-receiving device, this first message being transmitted to the payment-receiving device by using the communications means that enables the transmission of data between the terminal and the payment-receiving device (i.e. in the present case Bluetooth);
upon reception of this first message by the payment-receiving device, a step of extraction of the encrypted data (PayENc);
a step of transmission of this encrypted data, in the form of a second message (MSG2) to the trusted component;
it is noted that, since the pieces of data are encrypted by the payment terminal to be transmitted to the trusted component, the payment-receiving device in this step plays only a relaying role: the payment-receiving device cannot obtain knowledge of the encrypted data since these are pieces of data encrypted by the payment terminal and intended for the trusted component;
upon reception of this second message (MSG2), the trusted component decrypts the encrypted data (PayENC) and transiently obtains data in clear form that it re-encrypts (PayENC2) using the necessary cryptographic equipment.

The step of transmission 307 is then implemented to retransmit the encrypted data to the trusted component.

More precisely, in at least one particular embodiment, the setting up of a secured communications channel is carried out as follows (the example taken is that of a communications channel between a peripheral and the trusted component): Prior to the setting up, the trusted component is provided with a white list containing a tuple {PeripheralIdentifier, PeripheralPublicKey} for each authorized peripheral. "PeripheralIdentifier" is the identifier of the peripheral and "PeripheralPublicKey" corresponds to the public key of the peripheral. Then, the setting up of the channels as such comprises the following steps:

the peripheral generates a nonce (random number) and transmits a pairing request pairing request={PeripheralIdentifier, PeripheralNonce};

the trusted component makes a search in the white list for the "PeripheralPublicKey" linked to the received "PeripheralIdentifier";

the applet generates a nonce (random number) and transmits a pairing response pairing response=PeripheralPublicKey.ENC(PeripheralNonce//Applet/Nonce);

the peripheral decrypts this pairing response with its private key "PeripheralPrivateKey";

the peripheral and the applet each, for their part, generate the Secure Channel key via the formula SHA-256 (SHA-256(PeripheralNonce||AppletlNonce)).

5.3. Other Characteristics and Advantages

Figure 4:
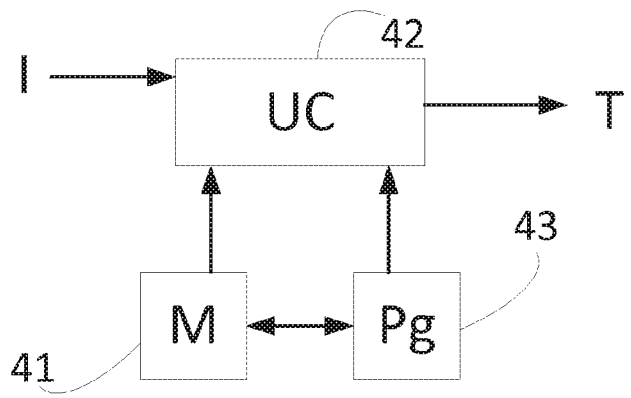

Referring to FIG. 4, we describe a peripheral for transmitting data in a secured communications channel according to the method described here above.

For example, the peripheral comprises a memory 41 constituted by a buffer memory, a processing unit 42 equipped for example with a microprocessor and driven by the computer program 43 implementing a method of data transmission in a secured communications channel. At initialization, the code instructions of the computer program 43 are, for example, loaded into a memory and then executed by the processor of the processing unit 42. The processing unit 42 inputs a pairing instruction from the payment-receiving device. The microprocessor of the processing unit 42 implements the steps of the transmission method according to the instructions of the computer program 43 to set up a secured communications channel with a trusted component (that is coupled with the payment-receiving device), the channel being established through the payment-receiving device (playing the role of a proxy relay); once the secured communications channel has been set up, the peripheral builds a message (the content of which is encrypted) addressed to the payment-receiving device, said message being relayed by the trusted component.

To this end, the peripheral comprises, in addition to the buffer memory 41, communications means such as network communications modules, data transmission means and, as the case may be, a dedicated encryption processor.

All these means can take the form of a particular processor implemented within the peripheral, said processor being a secured processor. According to one particular embodiment, this peripheral implements a particular application that is in charge of the performance of the encryption and the transmission of data, this application being for example provided by the manufacturer of the processor in question in order to enable the use of said processor. To this end, the processor comprises unique identification means. These unique identification means ensure the authenticity of the processor.

Besides, the peripheral also comprises an identifier, said identifier being used by the trusted component during the creation of the secured communications channel in order to authorize or not authorize the peripheral to get connected to the payment-receiving device.

Figure 5:
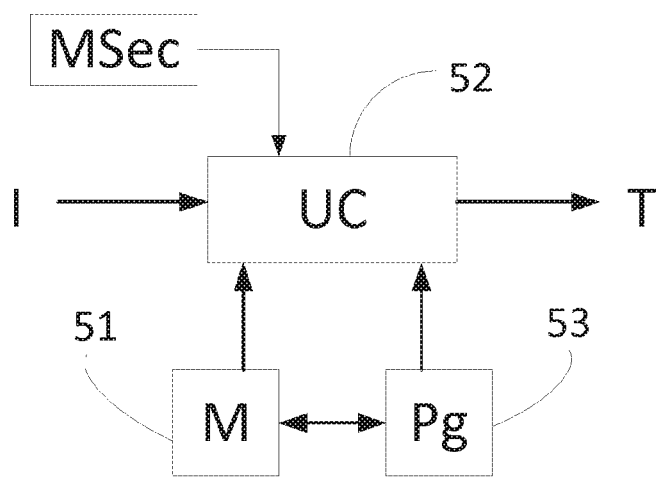
FIG. 5 is a summary description of the architecture of a peripheral such as a payment terminal.

Referring to FIG. 5, we describe a trusted component implemented to receive encrypted data from a sender device according to the method described here above.

For example, the trusted component comprises a memory 51 comprising a buffer memory, a processing unit 52 for example with a microprocessor and driven by the computer program 53 implementing a method for receiving encrypted data.

At initialization, the code instructions of the computer program 53 are, for example, loaded into a memory and then executed by the processor of the processing unit 52. The processing unit 52 inputs requests for setting up secured channels (coming from a peripheral and/or a payment-receiving device) and thereafter inputs encrypted data coming from these devices. The microprocessor of the processing unit 52 implements the steps of the data transmission method according to the instructions of the computer program 53 to control the validity of the requests for setting up secured channels (as a function of identifiers provided in these requests).

To this end, the device comprises, in addition to the buffer memory 51, communications means, data transmission means and, as the case may be, an independent encryption processor.

All these means can take the form of a particular processor constituting the trusted component, said processor being a secured processor and/or making use of a secured memory (Msec). According to one particular embodiment, this trusted component implements a particular application which is in charge of carrying out the reception and control of the received data, this application being for example provided by the manufacturer of the processor in question in order to enable the use of said processor. To this end, the processor comprises unique identification means. These unique identification means ensure the authenticity of the processor.

Besides, the trusted component furthermore comprises means for obtaining encryption keys, for example encryption keys known as "session" keys which are derived for example from master keys recorded within the component itself.

Depending on the embodiments, the trusted component also comprises means for managing a list, called a white list, of devices authorized to set up secured transmission channels. More particularly, the trusted component can comprise a first physical memory, of a predetermined size, into which a list is inserted. The trusted component can also include a second physical memory, of a predetermined size, into which encrypted (or decrypted) data blocks are inserted subsequently to the reception processing of these pieces of data. These pieces of data can also be inserted and managed in the secured memory (Msec) of the trusted component when this component is provided with one. This makes it even more complicated to intercept data and understand the operation of the trusted component.

A remote transmission server can also transmit the white list (through a proxy/component executed in Rich OS) in the secured memory of the trusted component. This communication can then be protected by a secured channel having a nature different from that of the secured channels used for the pairing.

Figure 6:
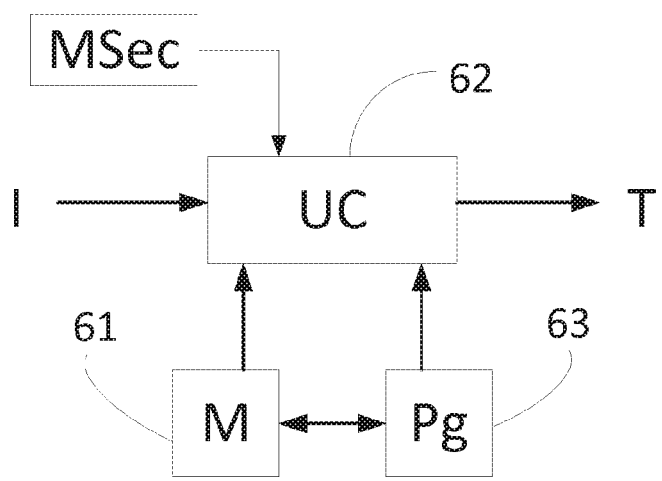
FIG. 6 is a summary description of the architecture of a payment-receiving device such as a cash register.

Referring to FIG. 6, we describe a payment-receiving device configured to receive encrypted data coming from a trusted component according to the method described here above.

For example, the payment-receiving device comprises a memory 61 comprising a buffer memory, a processing unit 62, equipped for example with a microprocessor and driven by the computer program 63, implementing a method for receiving encrypted data.

At initialization, the code instructions of the computer program 63 are, for example, loaded into a memory and then executed by the processor of the processing unit 62. The processing unit 62 inputs especially encrypted data coming from a trusted component, data received subsequently to the initialization of the payment-receiving device and to the transmission, by this device, of a request for setting up a secured communications channel with the trusted component. The microprocessor of the processing unit 62 implements the steps of the data transmission method according to the instructions of the computer program 63 to receive data coming from the trusted component and to route the data coming from the peripheral towards the trusted component.

To this end, the device comprises, in addition to the buffer memory 61, communications means (such as network communications means), data transmission means and, possibly an independent encryption processor.

All these means can take the form of a particular processor implemented within the payment-receiving device, said processor being a secured processor and/or making use of a secured memory (Msec). According to one particular embodiment, this payment-receiving device implements a particular application that is in charge especially of receiving and controlling the received data, this application being for example provided by the manufacturer of the processor in question in order to enable the use of said processor. To this end, the processor comprises unique identification means. These unique identification means ensure the authenticity of the processor.

Besides, the payment-receiving device furthermore comprises means for obtaining encryption keys, for example encryption keys known as "session" keys which are derived for example from master keys, recorded within the payment-receiving device itself.

Depending on the embodiments, the payment-receiving device also comprises means for managing secured data. More particularly, the payment-receiving device can comprise a first physical memory, of a predetermined size, in which the data coming from the peripheral are recorded and then routed. The payment-receiving device can also include a second physical memory, of a predetermined size, in which the encrypted data blocks (or decrypted data blocks) are inserted subsequently to the processing of the reception of this data coming from the trusted component. These data can also be inserted and managed in the secured memory (Msec) of the payment-receiving device when this device is provided with such a memory. This makes the task of intercepting data and understanding the working of payment-receiving device even more complex.

The invention claimed is:

1. A method for securing transmission of data, implemented within a secured execution environment of an electronic device, called a trusted component, said trusted component being coupled to a cash register of a merchant, said method for transmitting data comprising the following acts performed by a secured processor of the trusted component executing a trust application:
   receiving, from the cash register, a first request for setting up a first secured communications channel with said trusted component, the first request comprising an identifier of said cash register, cyphered by the cash register with a key of said trusted component;
   in response to receiving the first request, the trusted component setting up said first secured communications channel between the trusted component and the cash register by using at least said identifier of said cash register contained in said first request;
   receiving, through a communication interface of the cash register, from a payment terminal of the merchant, distinct from the cash register, a second request for setting up a second secured communications channel with said trusted component, wherein the second request corresponds to a pairing instruction, sent to the payment terminal by the cash register, wherein the pairing instruction comprises session initialization data;
   in response to receiving the second request, the trusted component setting up said second secured communications channel between the trusted component and said payment terminal by using at least one piece of data contained in said second request; and
   after setting up the first and second secured communications channels:
      receiving a first message through the second secured communications channel established with said secure component, originating from the payment terminal and addressed to said cash register, the first message containing said session initialization data intended for the cash register,
      extracting said session initialization data from the first message, and
      transmitting a second message to the cash register through the first secured communications channel, the second message containing the session initialization data intended for the cash register.

2. The method for securing transmission according to claim 1, wherein the act of setting up said first secured communications channel comprises:
   extracting the identifier of said cash register from the received first request;
   searching, within an authorization data structure, for a piece of data corresponding to said identifier of said cash register;
   and in response to said search delivering a positive result:
      pairing said cash register with said trusted component, implementing a predetermined pairing protocol.

3. The method for securing transmission according to claim 1, wherein the act of setting up said second secured communications channel comprises:
   extracting an identifier of said payment terminal from the received second request;
   searching, within an authorization data structure, for a piece of data corresponding to said identifier of said payment terminal;
   and in response to said search delivering a positive result:
      pairing said payment terminal with said trusted component, implementing a predetermined pairing protocol.

4. The method for securing transmission according to claim 1 wherein:
   receiving the first message comprises receiving a message of confirmation of pairing coming from said payment terminal, which comprises at least one first piece of encrypted pairing confirmation data;
   the extracting comprises decrypting said at least one first piece of encrypted pairing confirmation data, delivering the at least one piece of pairing confirmation data;
   encrypting said at least one piece of pairing confirmation data, delivering at least one second piece of encrypted pairing confirmation data;
   transmitting said second message comprises transmitting said at least one second piece of encrypted pairing confirmation data to said cash register through the first secured communication channel.

5. The method for securing transmission according to claim 4, wherein the act of receiving the first message originating from said payment terminal comprises receiving said at least one first piece of encrypted pairing confirmation data through the communication interface of said cash register, which plays a role of a relay between said payment terminal and said trusted component and relays the at least one first piece of encrypted pairing confirmation data to the trusted component.

6. An electronic device for securing transmission of data, having available a secured execution environment, called a trusted component, said trusted component being coupled with a cash register of a merchant, said trusted component comprising:
a secured processor; and
a non-transitory computer-readable medium comprising instructions of a trust application stored thereon, which when executed by the processor configure the trusted component to perform acts comprising:
receiving, from the cash register, a first request for setting up a first secured communications channel with said trusted component, the first request comprising an identifier of said cash register, cyphered by the cash register with a key of said trusted component;
in response to receiving the first request, the trusted component setting up said first secured communications channel between the trusted component and the cash register by using at least said identifier of said cash register contained in said first request;
receiving, through a communication interface of the cash register, from a payment terminal of the merchant, distinct from the cash register, a second request for setting up a second secured communications channel with said trusted component, wherein the second request corresponds to a pairing instruction, sent to the payment terminal by the cash register, wherein the pairing instruction comprises session initialization data;
in response to receiving the second request, the trusted component setting up said second secured communications channel between the trusted component and said payment terminal by using at least one piece of data contained in said second request; and
after setting up the first and second secured communications channels:
receiving a first message through the second secured communications channel established with said secure component, originating from the payment terminal and addressed to said cash register, the first message containing said session initialization data intended for the cash register,
extracting said session initialization data from the first message, and
transmitting a second message to the cash register through the first secured communications channel, the second message containing the session initialization data intended for the cash register.

7. A system comprising:
a cash register of a merchant;
a payment terminal of the merchant, said payment terminal being distinct from the cash register and configured to carry out payment operations in favor of said cash register; and
a trusted component providing a secured execution environment, said trusted component being coupled with the cash register, and said trusted component comprising:
a secured processor; and
a non-transitory computer-readable medium comprising instructions of a trust application stored thereon, which when executed by the processor configure the trusted component to perform acts comprising:
receiving, from the cash register, a first request for setting up a first secured communications channel with said trusted component, the first request comprising an identifier of said cash register, cyphered by the cash register with a key of said trusted component;
in response to receiving the first request, the trusted component setting up said first secured communications channel between the trusted component and the cash register by using at least said identifier of said cash register contained in said first request;
receiving, through a communication interface of the cash register, from the payment terminal of the merchant, distinct from the cash register, a second request for setting up a second secured communications channel with said trusted component, wherein the second request corresponds to a pairing instruction, sent to the payment terminal by the cash register, wherein the pairing instruction comprises session initialization data;
in response to receiving the second request, the trusted component setting up said second secured communications channel between the trusted component and said payment terminal by using at least one piece of data contained in said second request; and
after setting up the first and second secured communications channels:
receiving a first message through the second secured communications channel established with said secure component, originating from the payment terminal and addressed to said cash register, the first message containing said session initialization data intended for the cash register,
extracting said session initialization data from the first message, and
transmitting a second message to the cash register through the first secured communications channel, the second message containing the session initialization data intended for the cash register.

8. A non-transitory computer-readable medium comprising a computer program product stored thereon, which comprises program code instructions for executing a method for securing transmission of data, when the instructions are executed by a processor implemented in a secured execution environment of an electronic device, called a trusted component, said trusted component being coupled to a cash register of a merchant, wherein the method comprises:
receiving, from the cash register, a first request for setting up a first secured communications channel with said trusted component, the first request comprising an identifier of said cash register, cyphered by the cash register with a key of said trusted component;
in response to receiving the first request, the trusted component setting up said first secured communications channel between the trusted component and the cash register by using at least said identifier of said cash register contained in said first request;
receiving, through a communication interface of the cash register, from a payment terminal of the merchant, distinct from the cash register, a second request for setting up a second secured communications channel with said trusted component, wherein the second request corresponds to a pairing instruction, sent to the payment terminal by the cash register, wherein the pairing instruction comprises session initialization data;
in response to receiving the second request, the trusted component setting up said second secured communications channel between the trusted component and said payment terminal by using at least one piece of data contained in said second request; and after setting up the first and second secured communications channels:

receiving a first message through the second secured communications channel established with said secure component, originating from the payment terminal and addressed to said cash register, the first message containing said session initialization data intended for the cash register, extracting said session initialization data from the first message, and transmitting a second message to the cash register through the first secured communications channel, the second message containing the session initialization data intended for the cash register.

9. The electronic device according to claim 6, wherein setting up said first secured communications channel comprises:

extracting the identifier of said cash register from the received first request;

searching, within an authorization data structure, for a piece of data corresponding to said identifier of said cash register;

and in response to said search delivering a positive result:

pairing said cash register with said trusted component, implementing a predetermined pairing protocol.

10. The electronic device according to claim 6, wherein setting up said second secured communications channel comprises:

extracting an identifier of said payment terminal from the received second request;

searching, within an authorization data structure, for a piece of data corresponding to said identifier of said payment terminal;

and in response to said search delivering a positive result:

pairing said payment terminal with said trusted component, implementing a predetermined pairing protocol.

11. The electronic device according to claim 6, wherein:

receiving the first message comprises receiving a message of confirmation of pairing coming from said payment terminal, which comprises at least one first piece of encrypted pairing confirmation data;

the extracting comprises decrypting said at least one first piece of encrypted pairing confirmation data, delivering the at least one piece of pairing confirmation data;

encrypting said at least one piece of pairing confirmation data, delivering at least one second piece of encrypted pairing confirmation data;

transmitting said second message comprises transmitting said at least one second piece of encrypted pairing confirmation data to said cash register through the first secured communication channel.

12. The electronic device according to claim 11, wherein receiving the first message originating said payment terminal comprises receiving said at least one first piece of encrypted pairing confirmation data through the communication interface of said cash register, which plays the role of a relay between said payment terminal and said trusted component and relays the at least one first piece of encrypted pairing confirmation data to the trusted component.

\* \* \* \* \*